United States Patent Office 3,510,665
Patented May 5, 1970

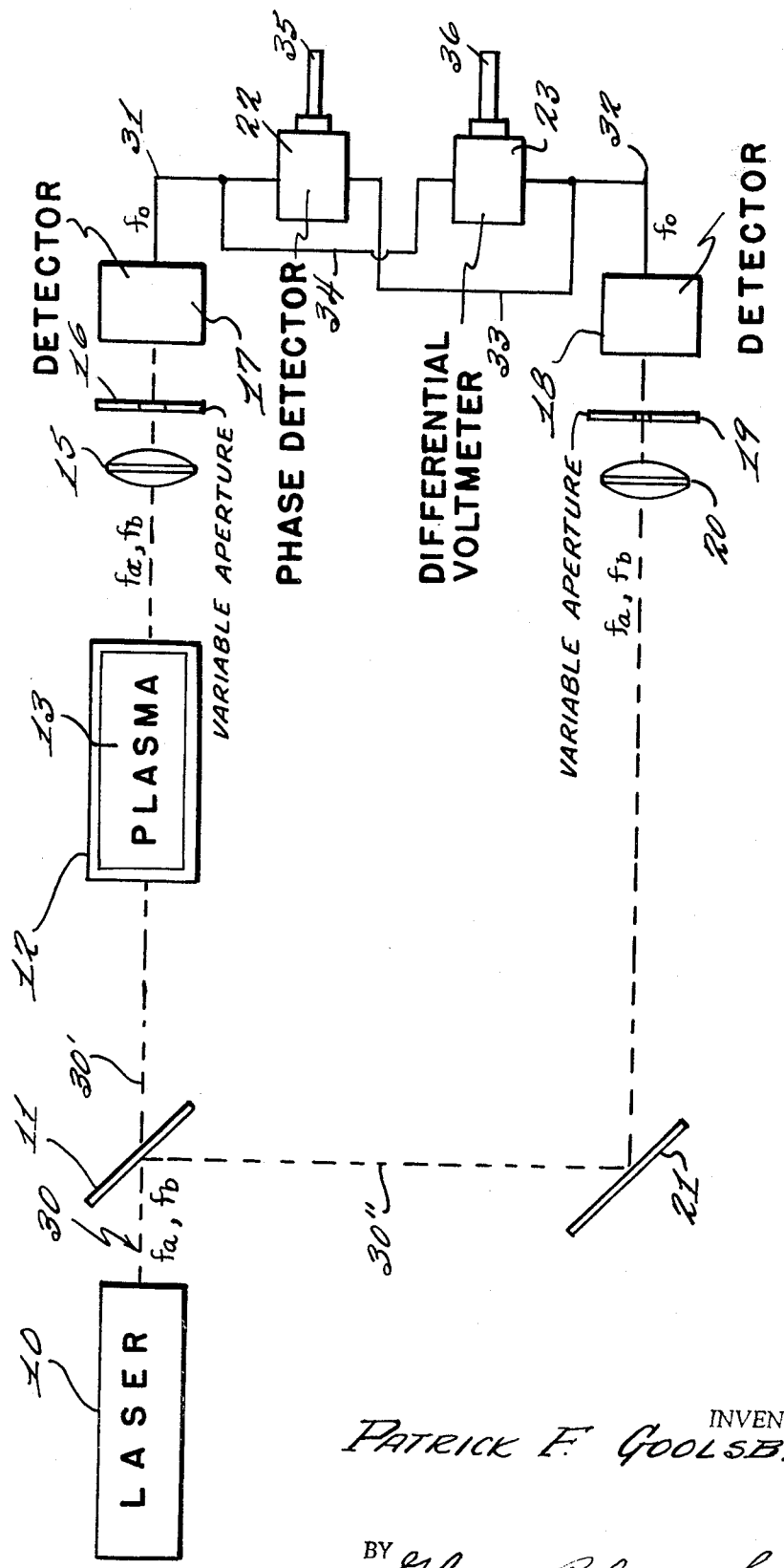

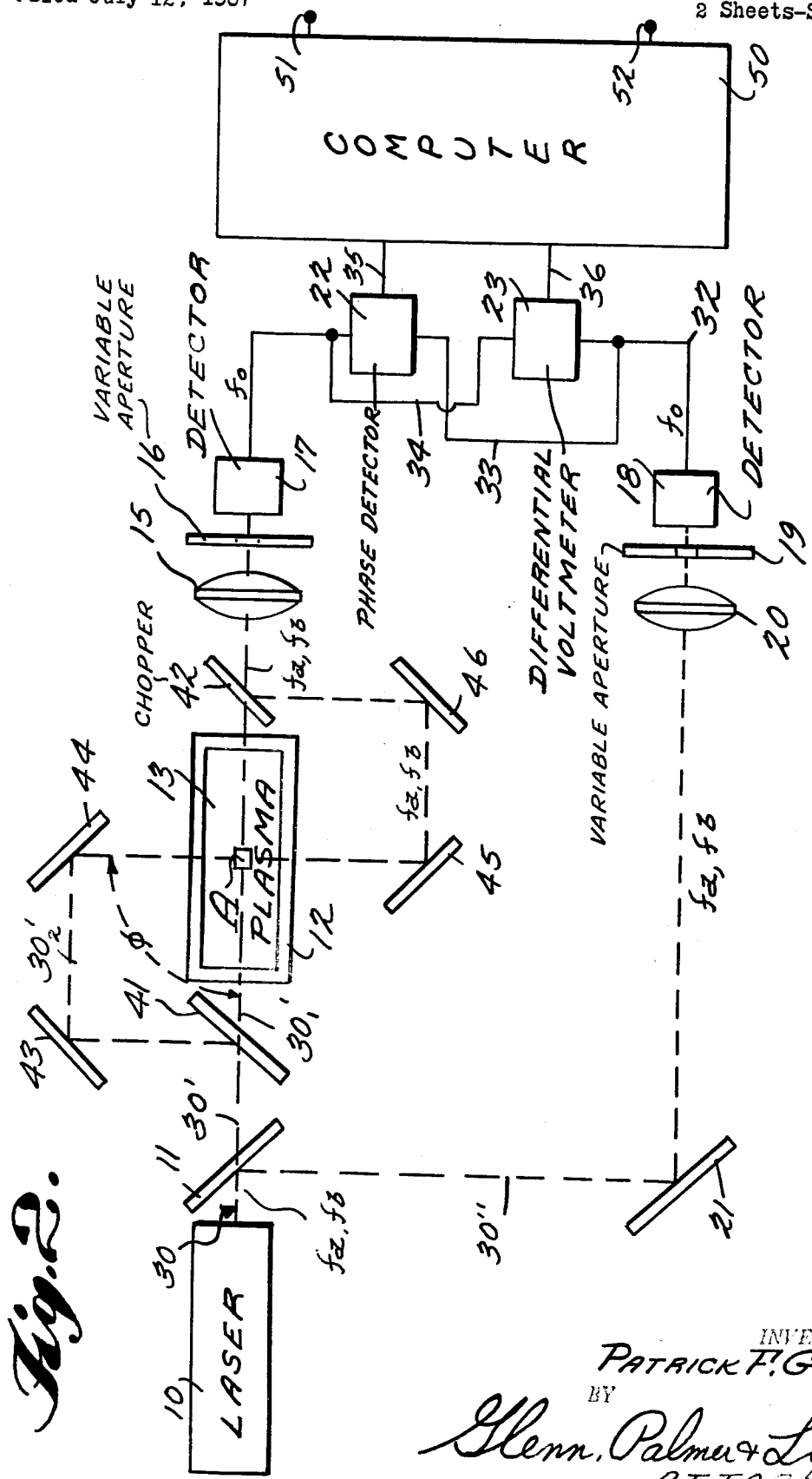

3,510,665
APPARATUS FOR PLASMA MEASUREMENT
Patrick F. Goolsby, Florence, Ala., assignor to Reynolds Metals Company, Richmond, Va., a corporation of Delaware
Filed July 12, 1967, Ser. No. 652,889
Int. Cl. G01n 21/26; H01j 39/12
U.S. Cl. 250—218
16 Claims

ABSTRACT OF THE DISCLOSURE

Apparatus for measuring instantaneous and long term electron densities and collision frequencies of plasma. A laser having at least two output modes is split into separate beams. The first beam is directed through the plasma thereby incurring a phase shift which is a function of electron density and a signal intensity attenuation which is a function of the collision frequency. The second beam is shunted past the plasma to an arrangement for comparing this beam with that existing from the plasma, thereby providing a measurement of electron density and collision frequency.

---

The present invention relates generally to the diagnostic analysis of an ionized gas, or plasma, and more specifically, concerns the use of coherent electromagnetic radiation in measuring significant characteristics of the plasma.

With increasing interest in the application of plasmas in various fields, such as atomic energy, electronics, magnetohydrodynamics, and the like, a need for convenient and economical apparatus for investigating plasma characteristics has developed, particularly with respect to those plasmas of high density, the use of which heretofore has been limited due to the absence of suitable apparatus capable of measuring their parameters.

A number of methods have been developed for measuring plasma characteristics. The most common of these utilize microwave techniques. However, arrangements employing microwaves have been limited to use with plasmas having electron densities less than approximately $10^{15}/cm.^{-3}$. Furthermore, microwave systems become prohibitively expensive and unreliable as this upper limit is approached. Other types of known arrangements suffer similar shortcomings.

The present invention provides for the measurement of plasma characteristics by apparatus which is not upper bounded by the electron density, nor is it bounded by plasma temperature or affected by the processes leading to ionization, and which is further both accurate and economical.

Briefly, the invention relies on the fact that electromagnetic radiation traversing a plasma experiences a phase shift which is a function of the electron density of the plasma and an attenuation of signal intensity which is a function of the plasma's collision frequency. In accordance with a preferred embodiment of the invention, the electromagnetic radiation employed is generated by a laser in the form of coherent energy having at least two discrete frequencies. This coherent radiation from the laser is split into two beams, one being directed through the plasma to be measured, and the other being shunted past the plasma. A suitable optical heterodyne detector is provided to receive the beam passing through the plasma and to produce an output signal, proportional to the incident radiation in both phase and amplitude, having a frequency equal to the difference between the two frequencies of the incident radiation. A second optical heterodyne detector is also provided to receive the beam which is shunted past the plasma and to generate an output signal proportional in phase and amplitude to that of the incident radiation. This latter output signal also has a frequency equal to the difference between the two frequencies of the incident radiation. The use of a two-frequency coherent beam of radiation and the optical heterodyne detectors makes possible the use of conventional instruments to compare the phase and amplitude difference between the beam directed through the plasma and the beam which is shunted past the plasma to thereby provide outputs representative of electron density and collision frequency of the plasma. Such apparatus is useful for measuring very dense plasmas as it is practically free of an upper bound with respect to density. A lower electron density boundary of approximately $10^9/cm.^{-3}$ may be reduced by the use of an infrared laser. Reduction of this lower density boundary may also be effected by increasing the path length of the coherent radiation as by the use of multireflectors, shutters or other similar and well known devices. The use of coherent electromagnetic energy also renders the apparatus, or measuring technique, unbounded by the temperature of the plasma and independent of the processes leading to ionization.

The above described embodiment, wherein a single beam transverses the length of the plasma, is effective to measure the average electron density and collision frequency across the plasma. In accordance with another embodiment, a second beam of coherent radiation is passed through the plasma along a path which intersects the first beam at a point within the plasma. The first and second beams are then chopped and alternately directed to the heterodyne detector and compared with the beam shunted around the plasma. The resulting data may then be processed by well known cross-correlation techniques to derive the magnitude of the electron density and collison frequency at the point at which the two beams traversing the plasma intersect.

A more complete understanding of the present invention may be had by reference to the following detailed description in light of the attached drawings in which:

FIG. 1 is a block diagram of a preferred embodiment of the present invention wherein the average of the relevant characteristics across the plasma is measured; and FIG. 2 is another embodiment of the present invention in which the value of the relevant characteristics at a given point is measured.

Referring to FIG. 1, a laser 10 generates a coherent beam of electromagnetic energy 30 having at least two discrete frequencies $f_a$ and $f_b$. The laser may be of any conventional design, such as a continuous wave gas laser, a semi-conductor injection laser, or any other suitable laser construction, including the pulsed-type of laser. Plural mode operation of a laser, i.e., a generation of an output having two or more frequencies or wavelengths, is a well known characteristic and need not be explained in detail herein. It is sufficient for complete understanding of the present invention to point out that the resonant cavity of a laser is usually a modified Fabry-Perot interferometer formed of high-reflectivity end walls and low-reflectivity side walls. Because of the large dimensions of the resonant cavity, as compared to the wavelength of the emitted radiation, the cavity can develop a number of axial resonant modes, each having a discrete wavelength or frequency. Means for tuning out undesirable modes, or supressing them, are well known which permit the emission of any number of desired axial modes. In accordance with the illustrative embodiment of the invention, a laser is employed from which only two dominant axial resonant modes are chosen, these being frequencies $f_a$ and $f_b$, as shown. In the present embodiment, the frequencies $f_a$ and $f_b$ are selected to be in the infrared range of the spectrum, i.e., $10^{12}$ and $10^{14}$ hertz. However, other frequencies can be utilized, and it should further be understood that a beam having more than two resonant modes may also be used. The use of only two modes, however, makes the detection of the signals less complicated.

Returning now to the drawings, beam 30 is split by a conventional half-silvered mirror 11 into two beams 30' and 30''. The beam 30' is directed through a sample cell 12 containing a plasma 13, a focusing lens 15, and a variable aperture 16 to a superheterodye detector 17. The beam 30'' is shunted past the plasma by a suitable reflector 21 and is directed through a focusing lens 20 and a variable aperture 19 to a superheterodyne detector 18. The superheterodyne detectors 17 and 18 are well known in the laser communication art and may take the form of a photomultiplier tube, solid state detector or the like. Optical filter means (not shown) may be provided to elimiate any undesired weavelengths and electrical filters (not shown) may be provided to eliminate beat frequencies caused by frequencies other than $f_a$ and $f_b$.

The output of each of the detectors 17 and 18 is proportional in magnitude and phase to the incident radiation and has a frequency $f_o$ which is equal to the difference between the frequencies $f_a$ and $f_b$. The output of detector 17 is connected via lead 31 to one input of phase detector 22 and via lead 34 to the input of a differential voltmeter 23. The output of detector 18 is connected via lead 32 to the other input of differential voltmeter 23 and via lead 33 to the other input of phase detector 22.

In accordance with the present invention, the phase detector 22 is in the form of a vector voltmeter of well known construction, the scale thereon (not shown) being calibrated in terms of the electron density of the plasma. However, it is apparent that an oscilloscope or other conventional phase measuring devices may be substituted for the vector voltmeter. An output terminal 35 may be provided on the phase detector 22 for connection to suitable recording apparatus or the like. Similarly, the differential voltmeter 23 has a scale thereon (not shown) calibrated to indicate the collision frequency of the plasma. Meter 23 may also be provided with an output terminal 36 for connection to additional indicating or recording apparatus.

In operation, calibration of the structure is achieved by removing the plasma from the path of beam 30'. With the plasma removed, beams 30' and 30'' reach detectors 17 and 18, respectively, in phase and at equal amplitude. Phase detector 22 and differential volmeter 23 are then adjusted to null indications.

Once the device has been calibrated, the plasma is disposed in the path of beam 30', as shown in the drawing. The radiation reaching detector 17 is shifted in phase relative to the beam 30'', by an amount which is a function of the electron density of the plasma, and it is attenuated by an amount which is a function of the collision frequency of the plasma. Consequently, the output of detector 17 at fequency $f_o$ is shifted in phase and differs in amplitude with respect to the output of detector 18. Phase detector 22 provides a measurement of the average electron density, or plasma frequency, and the differential voltmeter 23 measures the average collision frequency of the plasma along the path of beam 30'.

In order to measure the electron density and/or the collision frequency at a given point within the plasma, as opposed to the average of these characteristics across the plasma, the apparatus shown in FIG. 2 is suggested by the present invention. The elements in FIG. 2 which are also found in FIG. 1 are numbered the same.

The apparatus shown in FIG. 2 is essentially the same as that shown in FIG. 1 except that the beam 30' is split into first and second beams, $30_1'$ and $30_2'$, by a partially silvered mirror 41. The beam $30_1'$ continues through the plasma in the same manner as in FIG. 1 to a beam chopper 42 which periodically interrupts the beam $30_1'$. The beam $30_2'$ is reflected by mirrors 43 and 44, then passes through the plasma at an angle $\phi$ which is shown here as 90°. The reflectors or mirrors 41, 43 and 44 are so positioned that the beam $30_2'$ intersects the beam $30_1'$ at point A within the plasma.

After traversing the plasma, the beam $30_2'$ is directed by reflectors 45 and 46 and the chopper 42 to detector 17. The chopper 42 is effective to alternately direct beams $30_1'$ and $30_2'$ in a well known manner to the detector 17 in time spaced relation.

The differential voltmeter output at 36 therefore alternates between a signal representing the average collision frequency, as sensed by beam $30_1'$, and the average collision frequency as sensed by beam $30_2'$. The phase detector output at 35 similarly alternates between a signal representing the average electron density as sensed by the beam $30_1'$ and $30_2'$.

A computer such as digital computer 50 is connected to the output terminals 35 and 36 and is programmed to cross-correlate the alternating signals on each input and to generate an output on terminals 51 and 52 representing the electron density and collision frequency, respectively, of the plasma at the point A. The computer 50 is, of course, only an example of the manner in which cross-correlation may be achieved and it is to be understood that the present invention contemplates the use of any other suitable method and means for effecting cross-correlation.

The angle $\phi$, above described as being 90°, may of course, take other values and may in fact, be varied by suitable control of the optical system so that the beam $30_2'$ is caused to "scan" the entire length of the beam $30_1'$ within the plasma.

The foregoing descriptions of preferred embodiments of the invention are not intended to limit the scope thereof, and it is to be understood that the invention is capable of being practiced in other embodiments. For example, by appropriate use of beam choppers for each of the beams 30' and 30'', a single superheterodyne detector may be used. It is also evident that a reference plasma, or other material, may be inserted in the path of the beam 30' to introduce a fixed or variable reference phase shift or signal attenuation. It should also be apparent that the particular optical apparatus for directing the various beams make take other and various forms within the scope of this invention.

It is therefore apparent to those of ordinary skill in the art that the invention is amenable to a variety of modifications with respect to mechanical components, circuitry, and electrical components, and hence, may be practiced in embodiments other than those particularly illustrated and described herein without departing from the scope of the appended claims.

What is claimed is:
1. Apparatus for measuring the electron density and collison frequency characteristics of a plasma comprising:
    means for generating coherent electromagnetic energy having at least two discrete frequency components;
    means for splitting said energy into first and second beams;
    means directing said first beam through the plasma to be measured;
    means for shunting said second beam past said plasma;
    superheterodyne detector means adapted to receive said first and second beams for producing a first signal and a second signal each having a phase and amplitude relationship proportional to the phase and amplitude of said first and second beams respectively, and a frequency equal to the difference between said two discrete frequency components;
    phase detector means for measuring the phase difference between said first and second signals to provide an indication of the electron density of said plasma; and
    means for comparing the amplitude of said first and second signals as measurement of the collision frequency of said plasma.

2. The apparatus of claim 1 wherein said superheterodyne detector means comprises first and second optical superheterodyne detector means for receiving said first and second beams respectively, the output of said first and second superheterodyne detector means comprising said first and second signals respectively.

3. The apparatus of claim 1 wherein said means for generating coherent electromagnetic energy comprises a laser operating in at least two discrete axial resonant modes.

4. The apparatus of claim 3 wherein said laser is operating in the infrared portion of the electromagnetic spectrum.

5. Apparatus for measuring the electron density characteristics of a plasma comprising:
  means for producing a beam of coherent electromnetic radiation having at least two distinct frequency components;
  means for directing a first portion of said coherent beam through said plasma along a first path;
  means for directing a second portion of said coherent beam through said plasma along a second path which intersects said first path at a point within said plasma;
  means for shunting a third portion of said coherent beam past said plasma;
  means for alternately comparing the phase of said first and second portions of said coherent beam with said third portion of said coherent beam and for generating an output alternately representing the average electron density of said plasma along said first and second paths; and
  means for cross-correlating the said alternate outputs from said comparing means as a measurement of the electron density of said plasma at the point defined by the intersection of said first and second paths.

6. Apparatus for measuring the collison frequency characteristics of a plasma comprising:
  means for producing a beam of coherent electromagnetic radiation having at least two distinct frequency components;
  means for directing a first portion of said coherent beam through said plasma along a first path;
  means for directing a second portion of said coherent beam through said plasma along a second path which intersects said first path at a point within said plasma;
  means for shunting a third portion of said coherent beam past said plasma;
  means for alternately comparing the amplitude of said first and second portion of said coherent beam with the amplitude of said third portion of said coherent beam and for generating outputs alternately representing the average collision frequency of said plasma along said first and second paths; and
  means for cross-correlating the said alternate outputs from said comparator as a measurement of the collision frequency of said plasma at the point defined by the intersection of said first and second paths.

7. Apparatus for measuring the electron density and collision frequency characteristics of a plasma comprising:
  means for producing a beam of coherent electromagnetic radiation having at least two distinct frequency components;
  means for directing a first portion of said coherent beam through said plasma along a first path;
  means for directing a second portion of said coherent beam through said plasma along a second path which intersects said first path at a point within said plasma;
  means for shunting a third portion of said coherent beam past said plasma;
  means for comparing the phase and amplitude of said first and second portions of the coherent beam with the phase and amplitude, respectively, of the third portion of said coherent beam as measurements of the average electron density and average collision frequency of said plasma, along said first and second paths; and
  means for cross-correlating the data representing said average electron density and collision frequency to determine the value of the collision frequency and electron density at the point within the plasma defined by the intersection of said first and second paths.

8. Apparatus for measuring the electron density characteristics of a plasma comprising:
  means for producing a beam of coherent electromagnet radiation having at least two distinct frequency components;
  means for directing a first portion of said coherent beam through said plasma and subsequently heterodyning the frequency components of said first portion to produce a first signal;
  means for shunting a second portion of said coherent beam past said plasma and heterodyning the frequency components of said second portion to produce a second signal; and
  means for comparing the phase of said first and second signals as a measurement of the electron density of said plasma.

9. The apparatus of claim 8 wherein said means for producing a beam of coherent electromagnetic radiation comprises a laser operating in at least two discrete axial resonant modes.

10. The apparatus of claim 9 wherein said laser is operating in the infrared portion of the electromagnetic spectrum.

11. The apparatus of claim 8 wherein said first and second signals have a frequency equal to the difference between said two distinct frequency components.

12. Apparatus for measuring the collision frequency characteristics of a plasma comprising:
  means for producing a beam of coherent electromagnetic radiation having at least two distinct frequency components;
  means for directing a first portion of said coherent beam through said plasma and heterodyning the frequency components of said first portion to produce a first signal;
  means for shunting a second portion of said coherent beam past said plasma and subsequently heterodyning the frequency components of said second portion to produce a second signal; and
  means for comparing the amplitude of said first and second signals as a measurement of the collision frequency of said plasma.

13. The apparatus of claim 12 wherein said means for producing a beam of coherent electromagnetic radiation comprises a laser operating in at least two discrete axial resonant modes.

14. The apparatus of claim 13 wherein said laser is operating in the infrared portion of the electromagnetic spectrum.

15. The apparatus of claim 12 wherein said first and second signals have a frequency equal to the difference between said two distinct frequency components.

16. The apparatus of claim 12 further comprising means for comparing the phase of said first and second signals as a measurement of the electron density of said plasma.

References Cited

UNITED STATES PATENTS

| | | | |
|---|---|---|---|
| 3,101,414 | 8/1963 | Grabowsky | 250—218 X |
| 3,191,047 | 6/1965 | Oliver | 250—217 X |
| 3,265,967 | 8/1966 | Heald | 324—58.5 |
| 3,293,438 | 12/1966 | Davis | 250—217 X |

WALTER STOLWEIN, Primary Examiner

U.S. Cl. X.R.

250—220; 324—58.5